June 13, 1933.     N. DEISCH     1,913,795

LIGHT RELAY

Filed Dec. 10, 1930

Inventor

Patented June 13, 1933

1,913,795

UNITED STATES PATENT OFFICE

NOEL DEISCH, OF WASHINGTON, DISTRICT OF COLUMBIA

LIGHT RELAY

Application filed December 10, 1930. Serial No. 501,406.

The present invention relates to improvements in light relays, particularly to that type of light relay in which application is made of the optical activity of certain transparent substances when subjected to strain, and its general object is to provide a relay of the above type in which the effective sensitivity of the relay for a given applied strain is greatly increased.

By a light relay is here understood an energy changing device whose output is light energy, this output being controlled through the action of independently applied energy such as electrical energy: examples are relays employing the piezo-electric property of certain crystals, the Faraday magneto-optic effect, and the Kerr effect in dielectrics, in all of which the control of the stream of light energy which flows through the relay is obtained by inducing a change in the state of polarization of this light stream by changing the optical properties of an optically active transparent substance which forms part of the relay by an application of strain to this substance.

The great inherent merits of relays of the above description as applied to the modulation of a beam of light is largely offset by the practical disadvantage that the amount of controlling energy that must be applied to obtain a difference of phase of one-half wave-length (corresponding to a change from full transmission to full extinction, or vice versa of the incident beam) is inconveniently high.

In the present invention the effective length of the light path is greatly increased and the sensitivity is correspondingly increased through the expedient of passing the incident polarized light repeatedly through the active space of the relay before the beam is allowed to pass onward to the analyzing prism and to the receptor. As applied to the Kerr cell, whose action depends on the property of birefringence of dielectrics when subjected to electrostatic strain, which form of relay will here be used to illustrate the application of the invention, this method of working operates to increase the voltage sensitivity of the cell without concurrently increasing its electrostatic capacity. The fact will be plain from an inspection of the following formula expressing the retardation in the Kerr cell; $d = KF^2 l$ wherein $d$ represents the phase difference in $\mu$, $K$ the Kerr constant of the dielectric, $F$ the field strength in volts per centimeter, and $l$ the length of the light path through the strained dielectric in centimeters.

Referring to the drawing.

Figure 1:
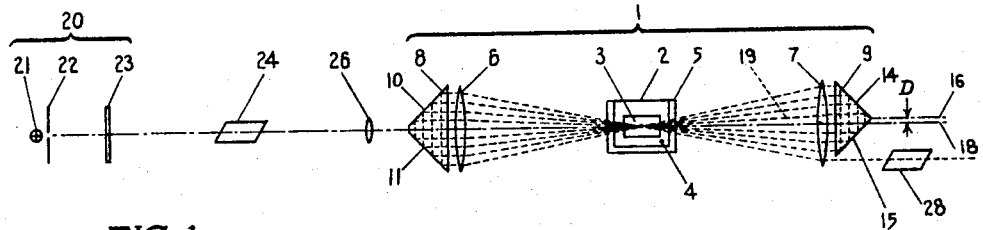
Fig. 1 is a diagram showing in side elevation an optical system including a light relay of the Kerr type incorporating means to secure a multiple passage of light through the active space of the relay.
Figure 2:
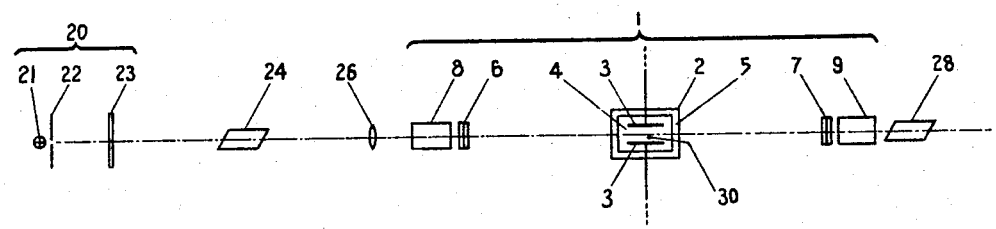
Fig. 2 is a diagram showing in top plan view the construction depicted in Fig. 1.
Figure 3:
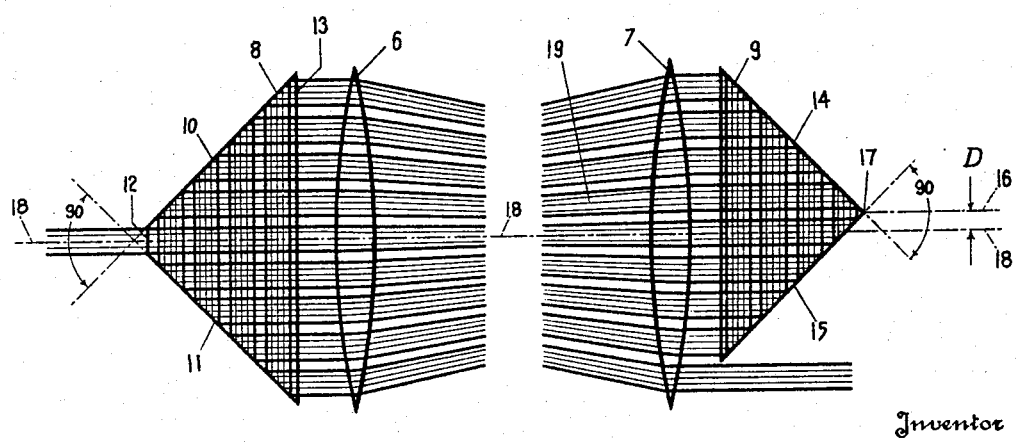
Fig. 3 is an enlarged side elevational view of the reflecting prisms and converging lenses, and clearly shows the path of the light beams and certain dimensional relations of the prisms.

The relay assembly 1 comprises the optically active cell 2, here shown as a Kerr cell having electrodes 3 and a dielectric such as nitrobenzol 4 held in a transparent container 5, a pair of converging lenses 6 and 7, which may conveniently be of the cylindrical type, and a pair of reflecting prisms 8 and 9. The lenses 6 and 7 have their common axis 18 in the plane of the electrodes 3 and are so placed that their common focal point falls centrally of the active space 30 between the electrodes 3 of the electro-optic cell 2. The prism 8 is a trapezoidal prism, the two faces 10 and 11 including a mutual angle of 90° and the plane faces 12 and 13 being parallel. The prism 9 is an isosceles triangular prism, the two faces 14 and 15 of which include a mutual angle of 90°. The plane 16, which passes through the apex 17 of the angle defining the slopes of the faces 14 and 15 of the prism 9 is displaced by a distance D from the principal optical axis 18 of the relay system 1.

The cell as above described is shown as forming part of a complete assembly adapted to operate as a modulating relay for use as a component part in apparatus such as sound recording apparatus, phototelegraphic or television receiving apparatus, or the like. In such applications it is often but not always preferable to employ a beam of limited spectral content in operating the electro-optical cell, and in the above diagram there is illustratively shown a monochromator 20 comprising a source of light 21, which may conveniently be a mercury vapor lamp, a restricted aperture 22, and a monochromatic filter 23 which last isolates preferably a single line of the mercury spectrum. It will of course be understood that any other means of producing an approximately monochromatic beam emanating from a point source is suitable for use in connection with the improved relay 1.

Light from the monochromator 20 is polarized in the polarizing prism 24 and collimated into a parallel bundle by the lens 26, whence it passes into the opening defined by the face 12 of the prism 8, through this prism, and on to the lens 6, where it is converged and passes between the plates 3 of the electro-optic cell 2. The beam again diverges, is collimated by the lens 7, and directed into the prism 9. Due to the lateral displacement or decentering of the latter with respect to the prism 8, the light beam falls on the face 15 of the prism 9, where it is reflected to the opposite face 14 of the prism and sent back through the lens 7 and into the cell 2. It will be noted that in its second passage into the cell 2, the light beam is displaced from the optical axis 18 of the relay system, and enters the cell 2 on a different axis 19, inclined to the axis 18 and intersecting the latter at the center of the cell 2, that is, at a point falling within the active space 30 between the electrodes 3 of this cell. The beam again diverges and enters the lens 6, being directed by the latter into the prism 8 where it falls on the face 11 and is reflected to the face 10, thence back through the lens 6, to the cell 2, the lens 7, and onto the face 11 of the prism 8, to the face 10, the lens 6, the cell 5, etc., the above action being repeated until the light beam, which at each circuit becomes inclined at a greater angle to the optical axis 18, in its final passage into the lens 7 escapes the prism 9 and passes out to the analyzing prism 28 and to the receptor (not shown).

It will be noted that in the above illustrative construction, where a Kerr cell is utilized, the light beam is passed in both directions through the cell, and it can be shown that under these conditions the several successive rotations to which the polarized beam is subjected, do not balance each other out, but are additive. The fact that the beam in each of its several passages through the cell passes centrally between the electrodes 3 makes it possible to keep the area of these electrodes and consequently the capacity of the cell reduced to the minimum.

The polarizing and analyzing prisms 24 and 28 may be of the Nicol type, the construction of which is well known. The principal plane of the polarizer 24 is turned on its longitudinal axis through an azimuth of 45° with respect to the plane of the electrical field excited between the plates 3 of the cell 2, whereas the principal plane of the analyzer 28 is desirably but not necessarily held orthogonal with the plane of the electrical field.

While I have described my invention with respect to the preferred form thereof, I reserve the right to make such changes in the details of construction or such substitution of equivalents as conform to the spirit of the invention or fall within its scope as defined in the appended claims.

I claim:

1. A light relay including a component involving an optically active medium having the property of changing the degree of retardation of polarized light traversing said medium in accordance with changes of strain of said medium, and means for changing the state of strain of at least a portion of said medium, means to direct light through said medium, and light path changing means disposed on opposite sides of said medium to cause the light to travel in a multiplicity of inclined paths back and forth through the medium, said paths intersecting at a point within the strained portion of said medium.

2. A light relay including an optically active cell involving a light transmitting medium having the property of changing the retardation of polarized light traversing said medium and means for impressing signal currents on said medium, means to direct light through said medium, and means on opposite sides of said medium to cause the light to travel in a multiplicity of inclined paths back and forth through the medium, which paths intersect at a point within the medium.

3. A light relay including a Kerr cell, means to direct light through said cell, and means on opposite sides of the cell to cause light to travel in a multiplicity of inclined paths back and forth through the cell, which paths intersect at a point between the electrodes of the cell.

4. A light valve comprising a Kerr cell, means on one side of the cell for directing light through the cell, means on the other side of the cell for receiving said light and redirecting it through the cell, and concentrating means for concentrating the light from each of said directing means, said concentrating means having a common focus, the cell being disposed with its electrodes on each side of the said focus.

5. A light relay including a Kerr cell, a pair of compound reflectors located on opposite sides of the cell and each including two plane surfaces having a mutual included angle of 90 degrees, the reflectors being oriented to image each other, and concentrating means for concentrating the light from each of the reflectors, said concentrating means having a common focus between the electrodes of the cell.

6. A light relay including an optically active cell involving a light transmitting medium having the property of changing the retardation of polarized light traversing said medium and means for impressing signal currents on said medium, means on one side of the medium for directing light through the medium, means on the other side of the medium for receiving the light and redirecting it through the medium, and concentrating means for concentrating the light from each of the directing means, said concentrating means having a common focus, and the medium being disposed so that said focus occurs within the medium.

7. A light relay including an optically active medium having the property of changing the retardation of polarized light traversing said medium and means to impress a signal on said medium, means to direct a beam of light through said medium, and means on opposite sides of the medium for causing said beam of light to pass back and forth through the medium a plurality of times each including two right-angled prisms disposed with their hypothenuse faces in parallel and opposed relation, one of said prisms being displaced with respect to the other of said prisms in a plane parallel to its hypothenuse face and in a direction perpendicular to the axis defined by the intersection of its two right-angle planes, said optically active medium being disposed between the hypothenuse faces of said two prisms, whereby the beam of light traversing said medium is intercepted by one of said prisms and is displaced in the direction of the relative displacement of said prisms at each passage of said beam from one of said prisms through said medium to the other of said prisms.

8. A light relay including an optically active medium having the property of changing the retardation of polarized light traversing said medium, and means to impress a signal on said medium, means to direct a beam of light through said medium, and means on opposite sides of the medium for causing said beam of light to pass back and forth through said medium a plurality of times to increase the effective length of passage of said beam each including two right-angled prisms disposed with their hypothenuse faces in parallel and opposed relation, one of said prisms being displaced with respect to the other of said prisms in a plane parallel to its hypothenuse face and in a direction perpendicular to the axis defined by the intersection of its two right-angled planes, and converging lenses disposed before the hypothenuse faces of said prisms, the conjugate foci of said lenses falling at a common point between said lenses, said optically active medium being disposed within the region of said common conjugate focal point, whereby the beam of light traversing said medium is returned through said medium by said prisms and lenses, and passes through said medium a plurality of times on differently inclined paths which intersect within said medium.

9. A light relay including two right-angled prisms disposed with their hypothenuse faces in parallel and opposed relation, one of said prisms being a trigonal prism and the other of said prisms being a tetragonal prism, said prisms being relatively displaced in a plane parallel to their hypothenuse faces and in a direction perpendicular to the axis defined by the intersection of their two right-angled planes, converging lenses disposed before the hypothenuse faces of said prisms, the conjugate foci of said lenses falling at a common point between said lens, a Kerr cell disposed within the region of said common conjugate focal point, and means to introduce a beam of light within said tetragonal prism through the face opposite its hypothenuse face.

In testimony whereof I affix my signature.

NOEL DEISCH.